United States Patent [19]

Fukuda et al.

[11] Patent Number: 5,185,092

[45] Date of Patent: Feb. 9, 1993

[54] LUBRICATING OIL FOR REFRIGERATOR

[75] Inventors: Masaaki Fukuda; Hirotaka Tomizawa; Mitsuo Ohta; Hideki Osaka; Satoshi Ogano; Takehisa Satoh; Kenji Ashibe; Takeshi Nomura, all of Ohi, Japan

[73] Assignee: Tonen Corporation, Tokyo, Japan

[21] Appl. No.: 648,805

[22] Filed: Jan. 31, 1991

[30] Foreign Application Priority Data

| Jan. 31, 1990 | [JP] | Japan | 2-22689 |
| Feb. 20, 1990 | [JP] | Japan | 2-39506 |
| Feb. 28, 1990 | [JP] | Japan | 2-50745 |
| Feb. 28, 1990 | [JP] | Japan | 2-50746 |
| Oct. 8, 1990 | [JP] | Japan | 2-270274 |
| Nov. 9, 1990 | [JP] | Japan | 2-305733 |
| Nov. 9, 1990 | [JP] | Japan | 2-305734 |

[51] Int. Cl.$^5$ .................. C09K 5/00; C10M 105/32
[52] U.S. Cl. .................. 252/56 S; 252/67; 252/68
[58] Field of Search .................. 252/67, 68, 56 S

[56] References Cited

U.S. PATENT DOCUMENTS

| 3,328,283 | 6/1967 | Godar | 252/68 |
| 3,773,668 | 11/1973 | Denis et al. | 252/56 S |
| 4,320,018 | 3/1982 | Yaffe | 252/56 S |
| 4,324,676 | 4/1982 | Gilbert | 252/68 |
| 4,428,854 | 1/1984 | Enjo et al. | 252/67 |
| 4,851,144 | 7/1989 | McGraw et al. | 252/67 |
| 5,032,305 | 7/1991 | Kamakura et al. | |

Primary Examiner—Ellen McAvoy
Attorney, Agent, or Firm—Armstrong, Westerman, Hattori, McLeland & Naughton

[57] ABSTRACT

The lubricating oil for refrigerator according to the present invention is a lubricating oil for refrigerator using 1,1,1,2-tetrafluoroethane refrigerant. Having esters as base oil, its viscosity range is between 2–30 mm/s at 100°C. By adding esters alone or by adding esters having different viscosity to esters base oil, or by adding polymer, the viscosity is adjusted to obtain the lubricating oil suitable for various types of refrigerators. The lubricating oil thus obtained has excellent compatibility with 1,1,1,2-tetrafluoroethane refrigerant, which is an alternative to freon, and has low hygroscopic property and high heat-resistant property.

By reducing the total acid number to 0.05 mg KOH/g or less, the corrosion-resistant property and insulating property of lubricating oil are not decreased, and the lubricating oil for refrigerator having having high refrigerant stability, hydrolytic stability and insulating property can be obtained.

Further, by adding sulfur type anti-wear agent, the better anti-wear effect of the lubricating oil can be obtained on iron/aluminum contact portion in the refrigerator.

20 Claims, No Drawings

LUBRICATING OIL FOR REFRIGERATOR

BACKGROUND OF THE INVENTION

The present invention relates to a lubricating oil for a refrigerator using 1,1,1,2-tetrafluoroethane, and in particular, to a lubricating oil for a refrigerator having excellent compatibility with the refrigerant and having a low hygroscopic property, high thermal stability and lubricating property.

As conventional refrigerants for refrigerators, R11 ($CCl_3F$) is used for air-conditioning systems in buildings, and R12 ($CCl_2F_2$) is used for electric refrigerators or as a refrigerant for automotive air-conditioning systems of the rotary type or reciprocating type. With the controversial problem of the destruction of ozone in the stratosphere, the development of an alternative substance is imminently needed.

In recent years, R123 ($CF_3CHCl_2$) has been studied as a possible alternative for R11, but some problems remain such as high price or the lack of a toxicity test. On the other hand, R22 ($CHClF_2$) is now being considered as an alternative for $R_{12}$ because of its easiness to decompose. However, the operating pressure at normal temperature is high because of low boiling point, and pressure-resistant hardware is therefore needed. Also, there are the problems of leaking from packings and hose components as well as the problems of low electric insulating property.

On the other hand, 1,1,1,2-tetrafluoroethane (R134a), known as an alternative for R12, does not contain chlorine which causes ozone destruction, and has passed the acute and subacute toxicity tests. Thus, attention is now focused on its application.

At present, a polyether synthetic oil having high viscosity is under development as lubricating oil for refrigerators. The operating temperature of a lubricating oil for a refrigerator is normally between −30° and 100° C. When a polyether synthetic oil is mixed with 1,1,1,2-tetrafluoroethane refrigerant, these substances separate from each other at high temperature, and it has also problems in hygroscopic property and lubricating property.

The requirements for lubricating oils for refrigerators are: wide temperature range for compatibility with the refrigerant (compatibility), i.e., no clouding at high temperature (high solvation of the refrigerant to the lubricating oil), high molecular polarity of the lubricating oil, no separation of the lubricating oil from the refrigerant at low temperature (high solubility of the lubricating oil to the refrigerant, and low molecular weight of lubricating base oil). For this reason, high compatibility with the refrigerant is very important, and it is necessary that the substance is not separated from the refrigerant at high or low temperatures and that it does not react with it. If the compatibility with the refrigerant is low, the equipment may seize on the portion of the refrigerator which is subject to high temperature.

The range of viscosity suitable for a lubricating oil for a refrigerator differs according to each type of refrigerator, and a lubricating oil having suitable viscosity is desirable.

Further, the lubricating oil for a refrigerator must not be corrosive to the refrigerating equipment, must not be reduced of its insulating property, and must have high stability to the refrigerant.

Also, the lubricating oil for a refrigerator must improve the wear-resistant property of aluminum components in piston and bearings, made of iron and aluminum, of the refrigerator.

The object of the present invention is to provide a lubricating oil for a refrigerator suitable for the use in the refrigerator using 1, 1, 1, 2-tetrafluoroethane refrigerant, having a wide compatibility temperature range with the refrigerant, having no corrosive property to refrigerating equipment, showing no reduction in insulating property, having a high stability to the refrigerant and improving the wear-resistant property of equipment components.

SUMMARY OF THE INVENTION

The lubricating oil for a refrigerator according to the present invention is a lubricating oil for a refrigerator using 1,1,1,2-tetrafluoroethane refrigerant, characterized in that esters as base oil and that viscosity range at 100° C. is between 2 and 30 mm$_2$/s.

Also, it is characterized in that said base oil is a diester of an aliphatic monohydric alcohol and an aliphatic dicarboxylic acid.

Further, it is characterized in that said base oil is a diester of an aliphatic monohydric alcohol and an aromatic dicarboxyilic acid.

It is also characterized in that said base oil is an ester selected from the ester of an aliphatic polyhydric alcohol and an aliphatic carboxylic acid, a partial ester of an aliphatic polyhydric alcohol and an aliphatic carboxylic acid, or a complex ester of an aliphatic polyhydric alcohol and a fatty acid having 3–12 carbons and aliphatic dicarboxylic acid or an aromatic dicarboxylic acid.

Further, it is characterized in that the fatty acid in said complex ester is a fatty acid having 5–7 carbon atoms.

It is also characterized in that said base oil is an ester of polyoxyalkyleneglycolmonoether and dicarboxylic acid given by the following formula (A), or esters consisting of a derivative added with polyoxyalkylene of trimethylolalkane given by the following general formula (B):

General formula (A)

(In the formula, $R^1$ or $R^5$ represents an alkyl group having 1–8 carbons. These may be identical to or different from each other. $R^2$ or $R^4$ is an alkylene group having 2–6 carbons. $R^3$ represents an alkylene group having 2–13 carbons or aromatic ring. m or n represents an integer of 2 or more.)

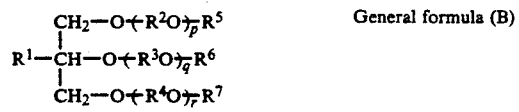

General formula (B)

In the formula, $R^1$ represents an alkyl group having 1–8 carbons, $R^2$, or $R^3$ or $R^4$ is an alkylene group having 2–6 carbons, $R^5$, $R^6$ or $R^7$ is an acyl group respectively. These may be identical to or different from each other. p, q or r is an integer of 1 or more.)

Further, the lubricating oil for a refrigerator according to the present invention is characterized in that the viscosity is adjusted by adding organic carboxylic acid ester having a different viscosity from the base oil or by adding polymer selected from polyester of polyalkylmethacrylate, polyalkyleneglycol and neopentylglycol with a carboxylic acid.

The lubricating oil for a refrigerator of this invention is characterized that the total acid number is 0.05 mg KOH/g or less.

Further, it is preferable that the lubricating oil for a refrigerator of this invention has a total acid number of 0.05 mg KOH/g or less, or more preferably 0.03 mg KOH/g or less, a peroxide number of 1 meq./kg or less, or more preferably 0.5 meq./kg or less, an aldehyde number of 1 mg KOH/g or less, or more preferably 0.8 mg KOH/g or less, a bromine index of 10 mg/100 g or less, or more preferably 5 mg/100 g or less, an ash content of 10 ppm or less, or more preferably 5 ppm or less. Also, moisture content is 500 ppm or less, or more preferably 200 ppm or less.

The lubricating oil for a refrigerator of this invention is characterized that a sulfur type antiwear agent is added.

Further, it is preferable that the sulfur type anti-wear agent is given by the following general formula:

$$(RO)_3P=S$$

(In the formula, R represents an alkyl group, an allyl group or a phenyl group, and these may be identical to or different from each other.)

The present invention is based on the findings that ester oil has good compatibility with 1,1,1,2-tetrafluoroethane, that it is thermally and chemically stable, and that it has a high lubricating property. The lubricating oil for a refrigerator has a different range depending on the types of refrigerators From the present invention, lubricating oil suitable for each type of refrigerator can be obtained either by selecting the ester with a suitable viscosity range or by adjusting viscosity through mixing esters with different viscosity range while maintaining compatibility of the organic carboxylic acid ester base oil with the refrigerant, or by adjusting the viscosity through the addition of polymers. As the result, the lubricating oil having high compatibility with the refrigerant and a low hygroscopic property as well as a good heat-resistant property can be obtained.

Further, an ester obtained from a normal esterification reaction is purified, and acid number, peroxide number, aldehyde number, bromine index, ash content and moisture content are adjusted to the range suitable for the refrigerator oil. As the result, the lubricating oil for a refrigerator is obtained, which shows no reduction in corrosive property and insulating property and has excellent refrigerant stability, hydrolytic stability and insulating property.

The lubricating oil for a refrigerator according to the present invention gives excellent anti-wear effect on iron/aluminium contact components in refrigerator through the addition of a sulfur type anti-wear agent.

DESCRIPTION OF THE PREFERRED EMBODIMENT

As the esters used as base oil for a lubricating oil for a refrigerator of this invention, the following types of esters having high molecular polarity are used:

Then, in this invention, the aliphatic carboxylic acids are used in a saturated structure.

(1) First, polyesters of a polyol and a straight chain or branched chain carboxylic acid can be used.

As the polyol forming these polyesters, there are trimethylolpropane, ditrimethylolpropane, trimethylolethane, ditrimethylolethane, pentaerythritol, dipentaerythritol, tripentaerythritol, etc. Fatty acids having 3-12 carbons can be used, and it is preferable to use fatty acids such as propionic acid, butyric acid, valeric acid, hexanoic acid, octanoic acid, nonanoic acid, decanoic acid, dodecanoic acid, isovaleric acid, neopentanoic acid, 2-methylbutyric acid, 2-ethylbutyric acid, 2-methylpentanoic acid, 2-methylhexanoic acid, 2-ethylhexanoic acid, isooctanoic acid, isononanoic acid, isodecanoic acid, 2,2'-dimethyloctanoic acid, 2-butyloctanoic acid, etc.

Partial esters of an aliphatic polyol and a straight chain or branched chain carboxylic acid can also be used.

As an aliphatic polyol, there are trimethylolpropane, ditrimethylolpropane, trimethylolethane, ditrimethylolethane, pentaerythritol, dipentaerythritol, tripentaerythritol, etc. Fatty acids having 3-9 carbons can be used. It is preferable to use fatty acids such as propionic acid, butyric acid, valeric acid, hexanoic acid, heptanoic acid, octanoic acid, nonanoic acid, 2-methylhexanoic acid, 2-ethylhexanoic acid, isooctanoic acid, isononanoic acid, isodecanoic acid, 2, 2'-dimethyloctanoic acid, -butyloctanoic acid, etc.

As the esters of an aliphatic polyol and a straight chain or branched chain carboxylic acid, there are pentaethyritol, dipentaerythritol, tripentaerythritol, and it is preferable to use a fatty acid having 5-12 carbons, or more preferably 5-7 carbons, e.g., valeric acid, hexanoic acid, heptanoic acid, 2-methylhexanoic acid, 2-ethylhexanoic acid, isooctinoic acid, isononanoic acid, isodecanoic acid, 2,2'-dimethyloctanoic acid, 2-butyloctanoic acid. Or, ester oil derived from the mixture can improve compatibility with the refrigerant at low temperatures.

These partial esters can be obtained through reaction by adequately adjusting the reacting mol number of aliphatic polyhydric alcohol and fatty acid.

(2) Diesters of neopentylglycol as the aliphatic polyol and straight chain or a branched chain carboxylic acid having 6-9 carbons, e.g. hexanoic acid, heptanoic acid, octanoic acid, nonanoic acid, 2-ethylbutyric acid, 2-methylhexanoic acid, 2-ethylhexanoic acid, isooctanoic acid, isononanoic acid, etc. can be used.

(3) Complex esters of partial esters of an aliphatic polyhydric alcohol with a straight chain or branched fatty acid having 3-9 carbons and a straight chain or branched chain aliphatic dicarboxylic acid or a aromatic dicarboxylic acid can be used.

As the aliphatic polyol, trimethylolpropane, trimethylolpropane, ditrimethylolethane, pentaerythritol, etc. can be used.

As the aliphatic carboxylic acid having 3-12 carbons, propionic acid, butyric acid, isobutyric acid, valeric acid, hexanoic acid, heptanoic acid, octanoic acid, nonanoic acid, decanoic acid, dodecanoic acid, 2-methylhexanoic acid, 2-ethylhexanoic acid, isooctanoic acid, isononanoic acid, isodecanoic acid, 2, 2'-dimethyloctanoic acid, 2-butyloctanoic acid, etc. can be used.

In such complex esters, it is preferable to use an aliphatic carboxylic acid having 5-7 carbons, or more preferably, an aliphatic carboxylic acid having 5-6 carbons. Ester oil thus obtained can improve the compatibility with the refrigerant at low temperatures.

As the aliphatic carboxylic acid, valeric acid, hexanoic acid, isovaleric acid, 2-methylbutyric acid, 2-ethylbutryic acid, or their mixtures can be used. The aliphatic carboxylic acid having 5 carbons and the aliphatic carboxylic acid having 6 carbons, mixed in weight ratio of 10:90 to 90:10, can be preferably used.

As the aliphatic dicarboxylic acid to be used for esterification with the polyhydric alcohol together with the aliphatic carboxylic acid, there are succinic acid, adipic acid, pimelic acid, suberic acid, azelaic acid, sebacic acid, undecanoic dicarboxylic acid, dodecanoic dicarboxyiic acid, tridecanoic dicarboxylic acid, carboxyoctadecanoic acid, carboxymethyloctadecanoic acid, docosanoic dicarboxylic acid, etc. As the aromatic dicarboxylic acid, there are phthalic acid, isophthalic acid, trimellitic acid as aromatic tricarboxylic acids, and pyromellitic acid as an aromatic tetracarboxylic acid.

The mixing ratio of the aliphatic monocarboxylic acid and the aliphatic acid or aromatic dicarboxylic acid, aromatic tricarboxylic acid or aromatic tetracarboxylic acid is preferably 6:1 (mol ratio). In the esterification reaction, the ratio of the total quantity of aliphatic monocarboxylic acid and aliphatic dicarboxylic acid or aromatic dicarboxylic acid to the quantity of aliphatic polyhydric alcohol is preferably 7:1 (mol ratio).

For the esterification reaction, the lubricating oil for a refrigerator of this invention may be prepared through the reaction of a partially esterified substance with an aliphatic monocarboxylic acid after the esterified substance is obtained by the reaction of the polyhydric alcohol with the aliphatic dicarboxylic acid or aromatic dicarboxylic acid in the predeterinined ratio, or the order of reaction of the carboxylic acids may be reversed. Or, mixed carboxylic acids may be used for the esterification.

(4) Dialkylesters (having 16-22 carbons) of straight chain or branched chain aliphatic dicarboxylic acids may be used.

As the aliphatic dicarboxylic acid, there are succinic acid, glutaric acid, adipic acid, pimelic acid, suberic acid, azelaic acid, sebacic acid, undecanoic dicarboxylic acid, dodecanoic dicarboxylic acid, tridecanoic dicarboxylic acid, carboxyoctadecanoic acid, carboxymethyloctadecanoic acid, docosanoic diacid, etc. or a substance having the same property as these may be used. It is preferable to use aliphatic dicarboxylic acids such as succinic acid, adipic acid, sebacic acid, undecanoic diacid, dodecanoic diacid, carboxyoctadecanoic acid, carboxymethyloctadecanoic acid, etc.

As alcohol components, there are alcohols having 5-8 carbons. More concretely, there are amyl alcohol, hexyl alcohol, heptyl alcohol and octyl alcohol as well as isomers of these substances, or more preferably, isoamyl alcohol, isohexyl alcohol and octyl alcohol.

More concretely, there are dioctyl adipate, diisoheptyl adipate, dihexyl sebacate, diheptyl succinate, etc.

(5) Dialkyl esters (having 18-26 carbons) of an aromatic dicarboxylic acid can also be used.

As the aromatic dicarboxylic acid, there are phthalic acid, isophthalic acid and the equivalent. As the alcohol component in dialkylester, alcohols having 5-8 carbons such as amyl alcohol, hexyl alcohcol, heptyl alcohol, octyl alcohol and isomers of these substances can be used. It is preferable to use isoamyl alcohol, isoheptyl alcohol, octyl alcohol, etc. Aromatic diesters include dioctyl phthalate, diisoheptyl phthalate, diisoamyl phthalate, etc.

(6) As alcohol components, addition products of alkylene oxide of monohydric alcohols selected among methanol, ethanol, propanol, butanol, etc. or isomers of these substances, or addition products of alkylene oxide of trihydric alcohol such as glycerine, trimethylolpropane, etc. can be used. Those addition products of 1-10 mols, or more preferably, 1-6 mols of alkylene oxide selected from ethylene oxide, propylene oxide, butylene oxide, amylene oxide, etc. and isomers of these substances are used.

As esters, there are diesters obtained by the esterification of addition products of alkylene oxide of monohydric alcohols by aliphatic dicarboxylic acids such as adipic acid, pimelic acid, suberic acid, azelaic acid, sebacic acid, undecane dicarboxylic acid, dodecane dicarboxylic acid, carboxyoctadecane acid, carboxymethyloctadecane acid, docosane dicarboxylic acid, etc. or by aromatic dicarboxylic acids such as phthalic acid.

Also, esters obtained through esterification of addition products of 1-10 mols of alkylene oxide of polyhydric alcohols such as glycerine, trimethylolpropane, etc. by straight chain or branched chain aliphatic carboxylic acids having 3-12 carbons can be used, e.g. propionic acid, butyric acid, valeric acid, hexanoic acid, heptanoic acid, octanoic acid, nonanoic acid, decanoic acid, dodecanoic acid, 2-methylhexanoic acid, 2-ethylhexanoic acid, isooctanoic acid, isononanoic acid, isodecanoic acid, 2, 2'-dimethyloctanoic acid, 2-butyloctanoic acid, etc.

As the fatty acid to constitute the above esters, straight chain or branched chain aliphatic carboxylic acids can be used. It is preferable to use branched chain aliphatic carboxylic acids because of high hydrolytic stability and good compatibility with hermetic coil.

Next, the description is given on the method to purify the esters.

Esters can be obtained by the esterification reaction, e.g., by esterification of alcohols and aliphatic carboxylic acid in the presence of a acid catalyst, e.g., phosphoric acid. The esters obtained by such method have a total acid number of 0.1-0.5 mg KOH/g, a peroxide number 0.1-5 meq./kg, an aldehyde number 0.1-5 mg KOH/g, a bromine index 1-100 mg/100 g, an ash content 5-50 ppm, and a moisture content 300-1000 ppm.

However, if the total acid number in the lubricating oil for a refrigerator is high, metal components may be corroded, and its function as the lubricating oil for refrigerator is decreased through hydrolysis of the lubricating oil itself. Also, the lubricating oil must have a high insulating property because it is placed in motor section of the refrigerator. Thus, it is preferable that the lubricating oil for a refrigerator has total acid number of 0.05 mg KOH/g or less.

Further, to increase the refrigerant stability, it is necessary to reduce the peroxide number, aldehyde number and bromine index to lower values, to reduce the ash content so as to reduce sludge and the like, and to reduce the water content in order to maintain hydrolytic stability and the insulating property.

For this purpose, it is necessary to purify the above esters obtained by the normal esterification reaction and to adjust the above indices for the properties of the ester oil to a range suitable for an oil for a refrigerator. As the result, an excellent oil for refrigerator can be prepared.

It is preferable to purify organic carboxylic acid esters through contact processing with silica gel, activated alumina, activated carbon, zeolite, etc. The contact condition in this case may be determined according to each case, and it is perferable to perform the processing at 100° C or less.

Normally, the viscosity at 100° C. of the lubricating oil for a refrigerator is 2-9 mm²/s, or more preferably, 3-7 mm²/s, and the lubricating oil for car air-conditioner is preferably 7-30 mm²/s. In a car air-conditioner, the viscosity range of an ester oil is preferably 7-15 mm²/s, or more preferably 8-11 mm²/s, for a reciprocating type compressor, and 15-30 mm²/s or more, preferably 20-27 mm²/s, for a rotary type compressor.

The viscosity range of the lubricating oil for a refrigerator according to the present invention is 2-30 mm²/s. The lubricating oil with a viscosity less than 2 mm²/s is not desirable because of low viscosity, poor lubricating and sealing properties, and low thermal stability. If it is more than 30 mm²/s, it is not desirable because compatibility with refrigerant is decreased.

Even when it is within the above range, the operating viscosity range differs according to each type of equipment with which it is used. If it exceeds 9 mm²/s in case of a refrigerator, the friction loss at the sliding portion may be increased.

Further, if it is less than 7 mm²/s in the case of a car air-conditioner of the reciprocating type, the problem arises with the lubricating property, and if it exceeds 15 mm²/s, the problem arises with increased friction loss on the sliding portion. In the case of a rotary type air-conditioner, a problem arises with the sealing property if it is less than 15 mm²/s, and a problem of compatibility with the refrigerant if it is more than 30 mm²/s.

Esters may be used alone, or the above esters may be adequately combined in order to adjust the viscosity range according to each application.

For example, when the viscosity is high in the case of complex type esters of (3) above, the viscosity range can be adjusted for each application by adding ester oil of an aliphatic polyhydric alcohol with an aliphatic carboxylic acid having 3-9 carbons while maintaining compatibility with refrigerant. Such ester oils have preferably a viscosity of 6 mm²/s or less at 100° C.

To adjust the suitable viscosity of the lubricating oil for a refrigerator, polymers for maintaining the compatibility with the refrigerant may be added to the ester oil. It is preferable that the polymer has a viscosity of mm²/s or more at 100° C.

As the polymer, polyesters of aliphatic dicarboxylic acids with polyalkylmethacrylate (e.g. containing an alkyl group having 4-8 carbons), polyalkylene glycol (e.g. copolymer comprising polypropylene glycol or polyethyleneglycol and polypropyleneglycol, or copolymers containing polypropyleneglycol and polytetramethyleneglycol), or neopentylglycol and given by the following formula may be used.

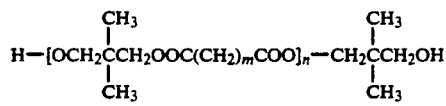

(m represents an integer of 1-20, and n an integer of 1-10.)

There is no special restriction to the addition of a quantity of polymer or ester oil if the desired viscosity is obtained. Normally, it is within the range between 1 wt % and 99 wt %.

It is preferable to add a sulfur type anti-wear agent to the oil for a refrigerator according to this invention.

Such an anti-wear agent is given by a general formula:

(In the formula, R represents an alkyl group, an allyl group or a phenyl group. These may be identical to or different from each other.) More concretely, sulfur type antiwear agents such as trialkylphosphorothionate, triphenylphosphorothionate, alkyldiallylphosphorothionate, etc. can be used.

Sulfides such as diphenyl sulfide, diphenyl disulfide, di-n-butyl sulfide, di-n-butyl disulfide, di-tert-dodecyl disulfide, di-tert-dodecyl trisulfide, etc., sulfurized oil such as sulfurized sperm oil, sulfurized dipentene, etc., dithiocarbonates such as xanthate, etc. or zinc thiophosphate type antiwear agent such as primary alkyl zinc thiophosphate, secondary alkyl zinc thiophosphate, alkyl-allyl zinc thiophosphate, allyl zinc thiophosphate, etc. can be used.

It is preferable to use the above anti-wear agent in the following ratio to ester oil: 0.01-5 wt %, or more preferably, 0.1-3 wt %.

The above anti-wear agent may be used alone, or in combination of two or more types.

As an antioxidant, amine type antioxidants such as dioctyldiphenylamine, phenyl-α-naphthylamine, alkyldiphenylamine, N-nitrosodiphenylamine, etc., phenol type antioxidants such as 2,6-di-t-butylparacresol, 4,4'-methylene-bis-(2,6-di-butylphenol), 2,6-di-butyl-α-dimethylamineparacresol, 2,6-di-t-butylphenol, etc., phosphorus type antioxidants such as tris-(2,4-di-t-butylphenyl) phosphite, tris-nonylphenyl phosphite, triphenyl phosphite, etc. can be used. It is preferable to use such an antioxidant in the following ratio to base oil: 0.01-10 wt %, or more preferably, 0.01-1.0 wt %.

As a corrosion inhibitor, there are isostearate, n-octadecyl ammonium stearate, duomin T-diolate, lead naphthenate, sorbitan oleate, pentaerythrit oleate, oleyl sarcosine, alkyl succinic acid, alkenyl succinic acid and derivatives of these substances. The preferable mixing ratio to base oil is 0.001-1.0 wt %, or more preferably 0.01-0.5 wt %.

As a defoaming agent, silicone can be used. The preferable mixing ratio to base oil is: 0.0001-0.003 wt %, or more preferably, 0.0001-0.001 wt %.

As a metal deactivator, benzotriazole, benzotriazole derivatives, thiadiazole, thiadiazole derivatives, triazole, triazole derivatives, dithiocarbamate, etc. may be used. It is preferable to use the above deactivator in the following ratio to base oil: 0.01-10 wt %, or more preferably, 0.01-1.0 wt %.

Further, as a rust preventive, succinic acid, succinic acid ester, oleic acid tallow amide, barium sulfonate, calcium sulfonate, etc. may be used. These substances are used in the following ratio: 0.01-10 wt %, or more preferably, 0.01-1.0 wt %.

In the following, the features of the invention will be described by examples. First, a description is given on the method to evaluate the refrigerator oil adopted in the examples.

Compatibility Test Method

Specimen oil and refrigerant (1,1,1,2-tetrafluoroethane) are placed in a glass tube in the ratio of specimen oil to refrigerant as 3 and 10 wt % to make the total volume to 2 ml, and these are mixed together. The glass tube is placed in a constant-temperature chamber provided with heating and cooling devices, and the separation temperature of specimen oil and refrigerant is measured.

Hygroscopic Property Test Method

In a dessicator containing water, specimen oil is placed, and the hygroscopic property is measured over time at room temperature and at 95% humidity.

EXAMPLE 1

The specimen oil 1 is an ester of dioctyl adipate, and the specimen oil 2 is an ester of pentaerythritol, both with straight chain $C_5$-$C_9$ acids. The straight chain $C_5$-$C_9$ acids consist of $C_5$ acid component by 30 wt %, $C_7$ acid component by 40 wt % and $C_9$ acid component by 30 wt %. Pentaerythritol and the straight $C_5$-$C_9$ acids are reacted with each other at the mol ratio of 1:4.

The specimen oil 3 is an ester of dipentaerythritol with straight chain $C_5$-$C_7$ acids, and the straight chain $C_5$-$C_7$ acids consist of $C_5$ acid component by 30 wt %, $C_6$ and component by 60 wt %, and $C_7$ acid component by 10 wt %. Dipentaerythritol and the straight chain $C_5$-$C_7$ fatty acids are reacted with each other at a mol ratio of 1:6.

The specimen oil 4 is an ester obtained by reaction of dihexyl succinate and the specimen oil 5 is an ester obtained by reaction of dipentaerythritol, both with oleic acid, at a mol ratio of 1:6.

Table 1 summarizes the results of the evaluation of performance characteristics as a refrigerator oil when various types of ester oils are added to 1,1,1,2-tetrafluorethane.

EXAMPLE 2

The specimen 6 is an ester of dipentaerythritol with aliphatic $C_5$-$C_6$ acids, and and the aliphatic $C_5$-$C_6$ acids contain $C_5$ acid component by 30 wt %, and $C_6$ acid component by 70 wt %. Dipentaerythritol and the aliphatic $C_5$-$C_6$ acids are reacted with each other at a mol ratio of 1:6.

The specimen oil 7 is an ester of pentaerythritol with aliphatic $C_5$-$C_6$ acids. The aliphatic $C_5$-$C_6$ acids contain $C_5$- acid component by 50 wt %, and $C_6$ acid component by 50 wt %. Pentaerythritol and aliphatic $C_5$-$C_6$ acids are reacted with each other at a mol ratio of 1:4.

The specimen oil 8 is an ester of pentaerythritol with an aliphatic $C_5$-$C_7$ fatty acid, and the aliphatic $C_5$-$C_7$ fatty acid contains $C_5$ acid component by 30 wt %, $C_6$ acid component by 40 wt %, and $C_7$ acid component by 30 wt %. Pentaerythritol and aliphatic $C_5$-$C_7$ acids are reacted with each other at a mol ratio of 1:4.

The specimen oil 9 is an ester of tripentaerythritol with aliphatic $C_5$-$C_6$ acids, and the aliphatic $C_5$-$C_6$ acids contain $C_5$ acid component by 40 wt % and $C_6$ acid component by 60 wt. Tripentaerythritol and aliphatic $C_5$-$C_6$ acids are reacted with each other at a mol ratio of 1:8.

The specimen oil 10 is an ester of pentaerythritol and aliphatic $C_7$-$C_9$ acids, and the aliphatic $C_7$-$C_9$ acids contain $C_7$ acid component by 50 wt %, and $C_9$ acid component by 50 wt %. Pentaerythritol and aliphatic $C_7$-$C_9$ fatty acid are reacted with each other at a mol ratio of 1:4.

The specimen oil 11 is an ester of a mixed alcohol of

TABLE 1

|  | Specimen oil 1 | Specimen oil 2 | Specimen oil 3 | Specimen oil 4 | Specimen oil 5 |
|---|---|---|---|---|---|
| Viscosity (mm²/s) at 100° C. | 2.4 | 5.0 | 10.5 | 1.0 | 16.5 |
| Compatibility with refrigerant |  |  |  |  |  |
| Two-phase separation temperature at high temperature |  |  |  |  |  |
| Oil component ratio 10 wt % | 110° C. or more | 95° C. | 100° C. | 110° C. or more | Separated at room temperature |
| Oil component ratio 3 wt % | 110° C. or more | 100° C. | 105° C. | 110° C. or more | Separated at room temperature |
| Two-phase separation temperature at low temperature |  |  |  |  |  |
| Oil component ratio 10 wt % | −40° C. or less | −20° C. | −40° C. or less | −40° C. or less | Separated at room temperature |
| Hygroscopic property (moisture %) |  |  |  |  |  |
| 7 days | 0.04 | 0.06 | 0.09 | 0.02 | — |
| 14 days | 0.08 | 0.10 | 0.17 | 0.05 | — |
| 21 days | 0.13 | 0.16 | 0.27 | 0.10 | — |
| 28 days | 0.17 | 0.22 | 0.32 | 0.13 | — |
| Thermal stability 140° C. × 24 hr. Evaporation loss | Low | Low | Low | High | Low |

As Table 1 shows, the specimen oils 1-3 have good compatibility with the refrigerant and a low hygroscopic property, and these oils can be used as a base oil for the lubricating oil for a refrigerator. The specimen oil 4 having the viscosity of less than 2 mm²/s is thermally unstable, while the specimen oil 5 has high thermal stability but the compatibility is low.

trimethylolpropane and pentaerythritol with an aliphatic $C_5$ acid. The mixing ratio of trimethylolpropane and pentaerythritol is 50:50 (wt %).

The specimen oil 12 is an ester of pentaerythritol and aliphatic $C_5$-$C_6$ acids, and the aliphatic $C_5$-$C_6$ acids contain $C_6$ acid component by 40 wt %, and $C_6$ acid component by 60 wt %. Pentaerythritol and aliphatic $C_5$-$C_6$ acids are reacted with each other at a mol ratio of 1:4.

The specimen oil 13 is an ester of trimethylolpropane and aliphatic $C_8$–$C_{12}$ acids, and trimethylolpropane and aliphatic $C_8$–$C_{12}$ acids are reacted with each other at a mol ratio of 1:3.

The specimen oil 14 is an ester of trimethylolpropane and aliphatic carboxylic acids having carbons of $C_8$ or more, and trimethylolpropane and aliphatic carboxylic acids having carbons of $C_8$ or more are reacted with each other at a mol ratio of 1:3.

The specimen oil 15 is a complex ester of trimethylolpropane and aliphatic $C_8$–$C_{12}$ acids and adipic acid.

The specimen oil 16 is an ester having the same constitutents as the above specimen oil 15, but the mixing ratio of aliphatic $C_8$–$C_{12}$ acid and adipic acid is different.

In these specimen oils, the viscosity at 100° C. ($mm^2/s$) and the refrigerant compatibility (two-phase separation temperature) at high and low temperatures at an oil component ratio of 10% were measured. The results are shown in Table 2.

TABLE 2

| | Viscosity* | Viscosity index | Refrigerant compatibility (°C.) | |
|---|---|---|---|---|
| | | | Low temperature | High temperature |
| Specimen oil 6 | 10.0 | 124 | −50° C. or less | 97° C. |
| Specimen oil 7 | 3.8 | 120 | −50° C. or less | 110° C. or more |
| Specimen oil 8 | 4.0 | 126 | −30° C. | 100° C. |
| Specimen oil 9 | 20.0 | 112 | −50° C. or less | 90° C. or more |
| Specimen oil 10 | 5.8 | 125 | +10° C. | 80° C. |
| Specimen oil 11 | 3.5 | 101 | −50° C. or less | 110° C. or more |
| Specimen oil 12 | 4.2 | 106 | −50° C. or less | 110° C. or more |
| Specimen oil 13 | 4.4 | 140 | Separated at room temperature | |
| Specimen oil 14 | 9.2 | 189 | Separated at room temperature | |
| Specimen oil 15 | 11.2 | 136 | Separated at room temperature | |
| Specimen oil 16 | 29.5 | — | Separated at room temperature | |

*$mm^2/s$ (100° C.)

As Table 2 shows, the specimen oils 6–12 have high compatibility with the refrigerant at high temperature as well as at low temperature, and these oils can be used as a base oil for the lubricating oil for a refrigerator, but the specimen oils 13–16 have low refrigerant compatibility.

EXAMPLE 3

The following table shows an example in which the specimen oils of the above Examples 1 and 2 are used in combination.

TABLE 3

| Specimen oils | Viscosity* | Mixing ratio (wt %) | Refrigerant compatibility (°C.) | |
|---|---|---|---|---|
| | | | Low temperature | High temperature |
| Combination of specimen oils 10 and 6 | 9.5 | 10:90 | −40° C. or less | 90° C. or more |
| Combination of specimen oils 2, 12 | 6.0 | 35:35:30 | −50° C. or less | 110° C. or more |

TABLE 3-continued

| Specimen oils | Viscosity* | Mixing ratio (wt %) | Refrigerant compatibility (°C.) | |
|---|---|---|---|---|
| | | | Low temperature | High temperature |
| and 6 | | | | |

*$mm^2/s$ (100° C.)

Thus, the specimen oils 10 and 2 have low refrigerant compatibility at low temperature by themselves, whereas refrigerant compatibility is increased and viscosity can be adjusted if they are used with the specimen oils 6 and 12 as base oils.

EXAMPLE 4

The specimen oils 17, 18 and 19 are prepared by adding polyalkylene glycol having viscosity of 13.0 $mm^2/s$ (100° C.) to the specimen oil 2 in varying quantities, and the refrigerant compatibility and the hygroscopic property were measured. The results are given in Table 4.

TABLE 4

| Specimen oil | Specimen oil 17 | Specimen oil 18 | Specimen oil 19 |
|---|---|---|---|
| Polymer adding quantity (wt %) | 25 | 50 | 75 |
| Viscosity after blending (1) | 6.5 | 8.4 | 10.5 |
| Compatibility with refrigerant | | | |
| Two-phase separation temperature at high temperature | | | |
| Oil component ratio 10 wt % | 85° C. | 76° C. | 66° C. |
| Oil component ratio 3 wt % | 91° C. | 80° C. | 71° C. |
| Two-phase separation temperature at low temperature | | | |
| Oil component ratio 10 wt % | −40° C. | −40° C. or less | −40° C. or less |
| Hygroscopic property (moisture %) | | | |
| 7 days | 0.3 | 0.6 | 1.0 |
| 14 days | 0.4 | 0.8 | 1.2 |
| 21 days | 0.4 | 0.9 | 1.4 |
| 28 days | 0.5 | 1.1 | 1.5 |

(1) $mm^2/s$ (100° C.)

The specimen oils 17–29 have high compatibility with the refrigerant and a low hygroscopic property.

EXAMPLE 5

A sealed tube test at high temperature was performed on the compatible substance which was obtained by mixing the specimen oil 2 of the Example 1 with 1,1,1,2-tetrafluoroethane refrigerant.

The test method was as follows: First, 1 g of specimen oil 2, 1 g of 1,1,1,2-tetrafluoroethane as well as one piece each of iron, copper and aluminum (1.7 mm in diameter and 40 mm in length) were sealed in a glass tube. Then, the tube was heated at 175° C. for 14 days (336 hours). At the completion of the test, the degree of discoloration of the specimen oil was measured, and the conditions of metal test pieces were examined.

Similar tests were performed on the compatible substance obtained by mixing the specimen oil 2 with the following additives and further with 1,1,1,2-tetrafluoroethane refrigerant. Also, a SRV vibration friction wearing test was performed to evaluate the lubricating property under the conditions as shown below.

As the additives, metal deactivator benzotriazole (BTA) was added to the specimen oil 2 by 0.1 wt %, antioxidant 2,6-di-t-butylparacresol (DBPC) by 0.5 wt %, or anti-wear agent tricresyl phosphate (TCP) by 0.5 wt %.

The conditions for the SRV vibration friction wearing test were:
Test piece: Steel ball of 10 mm in dia. (SUJ2-)/aluminum plate (A390)
Oil temperature: 140° C.
Stroke: 1.25 mm
Load: 50N
Frequency: 15 Hz
Duration: 30 minutes The results of the test are shown in Table 5A and Table 5B.

TABLE 5A

| To specimen oil 2 | | Color of specimen oil | | External appearance of test piece | | |
|---|---|---|---|---|---|---|
| Additives | Added q'ty | Before test | After test | Iron | Copper | Aluminum |
| — | — | 0.5 | L1.0 | Good | Good | Good |
| BTA | 0.1 | 0.5 | L1.0 | Good | Good | Good |
| DBPC | 0.5 | 0.5 | L1.0 | Good | Good | Good |
| TCP | 0.5 | 0.5 | L1.0 | Good | Good | Good |
| DBPC | 0.3 | 0.5 | L1.0 | Good | Good | Good |
| TCP | 0.3 | 0.5 | L1.0 | Good | Good | Good |

Added quantity is in wt %.

TABLE 5B

| | Composition (wt %) | Lubricating property (Wear scar m/m) |
|---|---|---|
| Specimen oil 2 | 100 | 1.10 |
| Specimen oil 2 +BTA +DBPC +TCP | 98.9 0.1 0.5 0.5 | 0.98 |
| Specimen oil 2 +DBPC +TCP | 99.4 0.3 0.3 | 1.00 |

The lubricating oil of this invention showed no deterioration in color and less sludge was generated during the test. The external appearance of the test piece was satisfactory after the test, and it was found that the lubricating oil has excellent chemical and thermal stability as well as a high lubricating property.

Next, a more concrete explanation is given on the case where the complex type of the above (3) is used as esters.

EXAMPLE 6

Description is given first to the specimen oils to be used in this example.

The specimen oil 20 is obtained, as follows: Pentaerythritol was used as the polyol, and succinic acid was used as the dicarboxylic acid. The monocarboxylic acid was aliphatic $C_5$–$C_6$ acids having a mixing ratio of $C_5$ acid to $C_6$ acid components of 1:1 (mol ratio). To 2 mols of pentaerythritol, 1 mol of succinic acid was given to react, and 6 mols of monocarboxylic acid was reacted to obtain this specimen oil.

The specimen oil 21 is obtained as follows: Pentaerythritol was used as the polyol, and adipic acid as the dicarboxylic acid. The monocarboxylic acid was aliphatic $C_5$–$C_6$ acids having a mixing ratio of $C_5$ to $C_6$ acid components of 1:1 (mol ratio). To 2 mols of pentaerythritol, 1 mol of adipic acid was given to react, and 6 mols of monocarboxylic acid was further reacted with it.

The specimen oil 22 is obtained as follows: Pantaerythritol was used as the polyol. The monocarboxylic acid was aliphatic $C_5$–$C_6$ acids having a mixing ratio of $C_5$ acid to $C_6$ acid components of 1:1 (mol ratio), and this was used to perform the esterification reaction for the preparation of ester oil for viscosity adjustment. The specimen oil 22 was obtained by mixing 60 wt % of this ester for viscosity adjustment with 40 wt % of the above specimen oil 20.

The specimen oil 23 was obtained by mixing 80 wt % of the ester for viscosity adjustment used for the above specimen oil 22 with 20 wt % of the above specimen oil 21.

In these specimen oils according to the present invention, the viscosity at 40° C. and 100° C. ($mm^2/s$) and refrigerant compatibility (two-phase separation temperature) at high and low temperatures and at an oil component ratio of 15% were measured. The results are given in Table 7.

The properties of the above ester oil for viscosity adjustment are also given as the specimen oil 25.

TABLE 6

| Specimen oil No. | Viscosity 40° C. | Viscosity 100° C. | Viscosity index | Refrigerant compatibility Low temperature | Refrigerant compatibility High temperature |
|---|---|---|---|---|---|
| Specimen oil 20 | 84.14 | 12.52 | 146 | −40° C. | 85° C. |
| Specimen oil 21 | 86.62 | 13.03 | 150 | −40° C. | 80° C. |
| Specimen oil 22 | 44.47 | 7.494 | 134 | −50° C. or less | 89° C. |
| Specimen oil 23 | 58.47 | 9.510 | 146 | −40° C. | 83° C. |
| Specimen oil 24 | 16.30 | 3.751 | 120 | −50° C. or less | 110° C. or more |

It is evident from the above table that the specimen oils according to the present invention have excellent compatibility at both high and low temperatures.

In the specimen oil 23 in the above Example 5, a sealed tube test was performed by the same procedure as in Example 4.

For this specimen oil, results similar to those of Example 4 were obtained.

Next, more concrete description is given in the case where the type of the above (6) is used as esters in the lubricating oil for a refrigerator.

EXAMPLE 7

The specimen oil 25 is a diester synthesized from polyoxypropyleneglycol monoether (manufactured by Sanyo Chemical Co., Ltd.; LB-65; molecular weight 340) and adipic acid.

The specimen oil 26 is a triester synthesized from trimethylolpropanepropyleneoxide addition product (Sanyo Chemical Co., ltd.; TP-400; molecular weight 400) and valeric acid.

The specimen oil 27 is a dihexyl succinate for comparison.

The specimen oil 28 is a commercial complex ester (viscosity 32.3 $mm^2/s$ at 100° C.) for comparison.

Table 7 shows the results of their evaluation as a refrigerator oil where the various types of ester oils are added to 1,1,1,2-tetrafluoroethane.

TABLE 7

| Specimen oil | Specimen oil 25 | Specimen oil 26 | Specimen oil 27 | Specimen oil 28 |
|---|---|---|---|---|
| Viscosity ($mm^2/s$) at 100° C. | 5.15 | 5.11 | 1.0 | 32.3 |
| Compatibility with refrigerant | | | | |
| Two-phase separation temperature at high temperature | | | | |
| Oil component ratio 10 wt % | 100° C. | 95° C. | 110° C. or more | Separated at room temperature |
| Oil component ratio 3 wt % | 105° C. | 100° C. | 110° C. or more | Separated at room temperature |
| Two-phase separation temperature at low temperature | | | | |
| Oil component ratio 10 wt % | −40° C. or less | −40° C. or less | −40° C. or less | Separated at room temperature |
| Hygroscopic property (moisture %) | | | | |
| 7 days | 0.04 | 0.09 | 0.02 | — |
| 14 days | 0.08 | 0.17 | 0.05 | — |
| 21 days | 0.13 | 0.27 | 0.10 | — |
| 28 days | 0.17 | 0.32 | 0.13 | — |
| Thermal stability 140° C. × 24 hr. Evaporation loss | Low | Low | High | Low |

From the above table, it is evident that the specimen oils 25–26 have high a compatibility with the refrigerant, a low hygroscopic property and can be used as a base oil for the lubricating oil of a refrigerator. On the other hand, the specimen oil 27 having a viscosity of less than 2 $mm^2/s$ has low thermal stability, while the specimen oil 28 having a viscosity of 30 $mm^2/s$ or more has high thermal stability but low compatibility with the refrigerant.

EXAMPLE 8

To the above specimen oil 25, polyalkyleneglycol having a viscosity of 13.0 $mm^2/s$ (100° C.) was added as a polymer in varying quantities to prepare the specimen oils 29, 30 and 31. For each of the lubricating oils for a refrigerator, the compatibility with the refrigerant and the hygroscopic property were tested.

The results are summarized in Table 8.

TABLE 8

| Specimen oil | Specimen oil 29 | Specimen oil 30 | Specimen oil 31 |
|---|---|---|---|
| Polymer added q'ty (wt %) | 25 | 50 | 75 |
| Viscosity after blending(*1) | 6.5 | 8.4 | 10.5 |
| Compatibility with refrigerant | | | |
| Two-phase separation temperature at high temperature | | | |
| Oil component ratio 10 wt % | 85 | 76 | 66 |
| Oil component ratio 3 wt % | 91 | 80 | 71 |
| Two-phase separation temperature at high temperature | | | |
| Oil component ratio | −40° C. | −40° C. | −40° C. |

TABLE 8-continued

| Specimen oil | Specimen oil 29 | Specimen oil 30 | Specimen oil 31 |
|---|---|---|---|
| 10 wt % | | or less | or less |
| Hygroscopic property (moisture %) | | | |
| 7 days | 0.4 | 0.7 | 1.1 |
| 14 days | 0.5 | 0.9 | 1.2 |
| 21 days | 0.5 | 1.0 | 1.5 |
| 28 days | 0.7 | 1.2 | 1.6 |

(*1)$mm^2/S$ (100° C.)

The above table shows that the specimen oils 29–31 have a high compatibility with refrigerant and a low hygroscopic property. To the above specimen oil 26, a sealed tube test was performed by the same procedure as in Example 4, and results similar to those of Example 4 were obtained.

Next, more concrete explanations are given on the case where a branched carboxylic acid is used in the esters in the lubricating oil for a refrigerator.

EXAMPLE 9

The specimen oil 32 is obtained through the reaction of pentaerythritol with 2-ethyl butyric acid in a mol ratio of 1:4.

The specimen oil 33 is obtained throuqh the reaction of pentaerythritol with 2-ethyl hexanoic acid in a mol ratio of 1:4.

The specimen oil 34 is obtained through the reaction of pentaerythritol with isononanic acid in a mol ratio of 1:4.

The results of the evaluation of the lubricating oils for a refrigerator are given in Table 9 when various types of ester oils are added to 1,1,1,2-tetrafluoroethane.

TABLE 9

| Specimen oil | Specimen oil 32 | Specimen oil 33 | Specimen oil 34 | Specimen oil 2 |
|---|---|---|---|---|
| Viscosity ($mm^2/s$) at 100° C. | 4.4 | 6.1 | 11.3 | 3.8 |
| Compatability with refrigerant | | | | |
| Two-phase separation temper- | | | | |

TABLE 9-continued

| Specimen oil | | Specimen oil 32 | Specimen oil 33 | Specimen oil 34 | Specimen oil 2 |
|---|---|---|---|---|---|
| ature at high temperature | | | | | |
| Oil component ratio 10 wt % | | 80° C. or more | 80° C. or more | 80° C. or more | 95° C. or more |
| Oil component ratio 3 wt % | | 80° C. or more | 80° C. or more | 80° C. or more | 100° C. |
| Two-phase separation temperature at high temperature | | | | | |
| Oil component ratio 10 wt % | | −40° C. or less | −15° C. | −25° C. | −20° C. |
| Hygroscopic property (moisture %) | | | | | |
| 7 days | | 0.02 | 0.02 | 0.02 | 0.06 |
| 14 days | | 0.04 | 0.04 | 0.04 | 0.10 |
| 21 days | | 0.05 | 0.05 | 0.06 | 0.16 |
| 28 days | | 0.06 | 0.06 | 0.07 | 0.22 |
| Hydrolytic stability (Total acid number mg KOH/g) | Before test | 0.03 | 0.03 | 0.03 | 0.03 |
| | After test | 2.2 | 2.2 | 2.4 | 3.2 |

The above table shows that the specimen oils 32–34 have a high compatibility with the refrigerant, a low hygroscopic property and a high hydrolytic stability.

Hydrolytic stability was measured as follows: 250 ml of oil was placed in an iron container having an inner volume of 350 ml. One piece each of aluminum and copper wires (3 mm in inner diameter and 30 mm in length) was placed in it as catalysts. Further, 1000 ppm of water was added, and 40 g of 1,1,1,2-tetrafluoroethane was added as a refrigerant. After the container was heated at 175° C. for 20 days, oil was taken out, and total acid number was measured.

Next, description is given on the purified ester oil in the lubricating oil for a refrigerator according to the present invention.

EXAMPLE 10

The specimen oil 35 is an ester obtained through the reaction of 1 mol of pentaerythritol with 4 mols of aliphatic $C_5$–$C_6$ acid after contact processing by a zeolite.

The specimen oils 36 and 40 are the esters obtained through the reaction of 1 mol of dipentaerythritol with 6 mols of aliphatic $C_5$–$C_6$ acid. The specimen oil 36 is obtained by further contact processing with a zeolite.

The specimen oils 37 and 41 are the esters obtained through the reaction of 1 mol of pentaerythritol with 4 mols of $C_5$–$C_6$ fatty acid. The specimen oil 37 is obtained by further contact processing with a zeolite.

The specimen oil 38 is obtained by adding 0.02 wt % of the metal deactivator benzotriazole and 0.2 wt % of the antioxidant diphenylamine to the specimen oil 35.

The specimen oil 39 is obtained by adding the same additives as those for the above specimen oil 38 to the specimen oil 36.

The specimen oil 42 is obtained by adding the same additives as those for the above specimen oil 38 to the specimen oil 40.

To these specimen oils, performance was evaluated by the following methods:

Total Acid Number Measuring Method

The total acid number was determined by the neutralization number of JIS K 2501.

Peroxide Number Measuring Method

The iodine titration method was used, by which potassium iodide was added to the specimen, and the isolated iodine was titrated. The peroxide number is expressed in milliequivalents to 1 kg of the specimen.

Aldehyde Number Measuring Method

The sodium hydroxide titration method was adopted, by which hydroxylamine hydrochloride was added to the specimen and the isolated acid was titrated by sodium hydroxide.

Bromine Index Measuring Method

Bromine index was determined by ASTM D 1492.

Ash Content Measuring Method

Ash content was determined by the ash content test method of JIS K 2272.

Moisture Measuring Method

The moisture was determined by the Karl Fischer method of the moisture testing methods of JIS K 2275.

Volume Resistivity Measuring Method

The volume resistivity test of the electric insulating oil testing methods of JIS C 2101 was used.

Hydrolytic Stability

In accordance with ASTM D 2619, the mixture of 75 g of the specimen and 25 g of water was heated together with a copper catalyst at 93° C. for 48 hours, and total acid number of the specimen oil was measured.

Refrigerant Stability

The mixture of the specimen and R-134a mixed at a mixing ratio of 2:1 was sealed in an autoclave together with iron, copper and aluminum catalysts and was heated at 175° C, for 480 hours. Then, the external appearance of the catalysts and the total acid number and hue of the specimen oil were measured (autoclave method).

On the compatible substance of the specimen oils as prepared above mixed with 1,1,1, 2-tetrafluoroethane refrigerant, the sealed tube test was performed at high temperature.

The test method (sealed tube test) is as follows: First, 1 g of refrigerant oil, 1 g of 1,1,1, 2-tetrafluoroethane, and one piece each of iron, copper and aluminum test pieces (1.7 mm in diameter; 40 mm in length) were sealed in a glass tube, and the tube was heated at 175° C. for 14 days (336 hours). After the test was completed, the change of color of the specimen oil was measured, and the conditions of the metal pieces were examined. The properties of the specimen oils and the test results are shown in the table below.

EXAMPLE 11

In the lubricating oil for a refrigerator having the base oil of the following esters, the friction wear as the refrigerator oil was evaluated in case where an antiwear agent was added.

The results of the evaluation on the following specimen oils are summarized in Table 11, and the results of the evaluation on the comparative specimen oil are shown in Table 12.

TABLE 10

| | Specimen oil 35 | Specimen oil 36 | Specimen oil 37 | Specimen oil 38 | Specimen oil 39 | Specimen oil 40 | Specimen oil 41 | Specimen oil 42 |
|---|---|---|---|---|---|---|---|---|
| Total acid number (mg KOH/g) | 0.01 | 0.03 | 0.05 | 0.01 | 0.03 | 0.26 | 0.10 | 0.26 |
| Peroxide number (meq./kg) | 0.1 | 0.3 | 0.6 | 0.1 | 0.3 | 1.5 | 2 | 1.5 |
| Aldehyde number (mg KOH/g) | 0.1 | 0.1 | 0.1 | 0.1 | 0.1 | 2 | 2 | 2 |
| Bromine index (mg/100 g) | 1 | 5 | 7 | 1 | 5 | 13 | 10 | 13 |
| Ash content (ppm) | 3 | 4 | 4 | 3 | 4 | 16 | 10 | 16 |
| Moisture (ppm) | 100 | 200 | 200 | 400 | 450 | 600 | 600 | 800 |
| Color (ASTM) | L 0.5 | L 0.5 | L 1.0 | L 0.5 | 0.5 | 3.0 | L 0.5 | 3.0 |
| Volume resistivity (25° C. $\Omega \cdot$ cm) | $5.5 \times 10^{13}$ | $2.1 \times 10^{13}$ | $1.1 \times 10^{13}$ | $5.6 \times 10^{13}$ | $2.2 \times 10^{13}$ | $5.0 \times 10^{9}$ | $2.3 \times 10^{10}$ | $5.2 \times 10^{9}$ |
| Hydrolytic stability Total acid number (mg KOH/g) | 0.02 | 0.05 | 0.08 | 0.02 | 0.04 | 0.65 | 0.29 | 0.54 |
| Refrigerant stability Autoclave method Total acid number (mg KOH/g) | 0.10 | 0.4 | 1.0 | 0.10 | 0.35 | 6.0 | 4.0 | 5.5 |
| Color (ASTM) | 2.5 | 2.5 | 2.5 | 3.0 | 3.0 | 6.0 | 5.0 | 6.5 |
| External appearance of catalyst | No abnormal sign | No abnormal sign | No abnormal sign | No abnormal sign | No abnormal sign | No abnormal sign | No abnormal sign | No abnormal sign |
| Sealed tube method Color (ASTM) | 1.0 | 1.0 | 1.0 | 1.0 | 1.0 | 3.0 | 2.5 | 3.5 |
| External appearance of catalyst | No abnormal sign | No abnormal sign | No abnormal sign | No abnormal sign | No abnormal sign | No abnormal sign | No abnormal sign | No abnormal sign |

Thus, it is evident that the lubricating oils for a refrigerator show less increase in total acid number, less change in hue after the test, keep good external appearance of catalyst, and show a high hydrolytic stability, refrigerant stability and insulating property.

Next, a description is given in the case where an anti-wear agent is added to the lubricating oils for a refrigerator of this invention.

The following description is given on the method to evaluate a refrigerator oil as adopted in the above examples.

Method to Evaluate Anti-Wear Property

This was evaluated by LFW-1 friction wear test in accordance with ASTM D 2981. To simulate the conditions in practical application, the test condition was set to an oil temperature of 120° C., and the load was set to 20 Lbs based on the hardness of an aluminum material. An Al—Sn alloy was used as the test piece for aluminum material.

Testing conditons
Load 20 Lbs; oil temperature 120° C.; number of revolutions 1000 rpm; test duration 60 minutes
Test piece material
Ring    SAE 4620 steel $H_{RC} = 60$ ($H_v = 694$)
Block   Al—Sn alloy $H_v = 49$ For all specimen oils, a mixed ester oil consisting of 10 wt % of the ester (viscosity 5.0 at 100° C.) of pentaerythritol and aliphatic $C_5-C_9$ acids and of 90 wt % of the ester (viscosity 10.0 at 100° C.) of dipentaerythritol and aliphatic $C_5-C_6$ acids were used as the base oil.

The specimen oils 43 and 44 contain triphenyl phosphorothionate as an anti-wear agent, the specimen oils 45 and 46 contain trialkyl-($C_{12}$)-phosphorothionate as an anti-wear agent, the comparative specimen oils 47 and 48 contain the phosphorus type anti-wear agent tricresyl phosphate, the comparative specimen oil 49 contains the phosphorus type anti-wear agent trioleyl phosphate, the comparative specimen oil 50 contains dilauryl hydrogenphosphate, and the comparative specimen oil 51 contains no anti-wear agent.

Dialkyldiphenylamine was used as an antioxidant, succinic acid imide was used as a corrosion inhibitor, and silicone was used as a defoaming agent.

The added quantity of each additive is given in wt %.

TABLE 11

| | Specimen oil 43 | Specimen oil 44 | Specimen oil 45 | Specimen oil 46 |
|---|---|---|---|---|
| Anti-wear agent added q'ty | 0.3 | 0.5 | 0.3 | 0.6 |
| Antioxidant added q'ty | 0.4 | 0.4 | 0.4 | 0.4 |
| Corrosion inhibitor added q'ty | 0.12 | 0.12 | 0.12 | 0.12 |
| Defoaming agent added q'ty | 0.0005 | 0.0005 | 0.0005 | 0.0005 |
| Items of evaluation | 5 | 8 | 7 | 9 |

TABLE 11-continued

| | Specimen oil 43 | Specimen oil 44 | Specimen oil 45 | Specimen oil 46 |
|---|---|---|---|---|
| Al wearing (mg) | | | | |

TABLE 12

| | Specimen oil 47 | Specimen oil 48 | Specimen oil 49 | Specimen oil 50 | Specimen oil 51 |
|---|---|---|---|---|---|
| Anti-wear agent added q'ty | 0.3 | 1.8 | 2.0 | 0.5 | — |
| Antioxidant added q'ty | 0.4 | 0.4 | 0.4 | 0.4 | 0.4 |
| Corrosion inhibitor added q'ty | 0.12 | 0.12 | 0.12 | 0.12 | 0.12 |
| Defoaming agent added q'ty | 0.0005 | 0.0005 | 0.0005 | 0.0005 | 0.0005 |
| Items of evaluation Al wearing (mg) | 16 | 24 | 36 | 22 | 18 |

As it is evident from the above tables, excellent anti-wear effect is obtained in case sulfur type anti-wear agent is used (specimen oils 43-46), whereas anti-wear effect is decreased even when compared with the specimen oil 51, to which no anti-wear agent is added, in case phosphorus type anti-wear agent is used (specimen oils 47-50).

What we claim is:

1. A lubricating oil for a refrigerator using a hydrofluorocarbon refrigerant, the oil comprising an ester of dipentareythritol or tripentaerythritol with an aliphatic monobasic acid having 3 to 7 carbon atoms, or mixtures thereof, the oil having a viscosity at 100° C. in the range of 7 to 30 mm$^2$/s.

2. A lubricating oil for a refrigerator using a hydrofluorocarbon refrigerant, the oil comprising an ester of dipentareythritol or tripentaerythritol with an aliphatic monobasic acid having 3 to 7 carbon atoms, or mixtures thereof, and an organic carboxylic acid ester having viscosity different from that of said ester, or a polymer selected from polyalkyl-methacrylate, polyester or neopentylglycol with a fatty acid, the oil having a viscosity at 100° C. in the range of 7 to 30 mm$^2$/s.

3. A lubricating oil for a refrigerator according to claim 1 or 2, wherein the oil has a total acid value of 0.05 mg KOH/g or less, a peroxide value of 1 meq./kg or less, an aldehyde value of 1 mg KOH/g or less, a bromine value index of 10 mg/100 g or less, an ash content of 10 ppm or less, and a moisture content of 500 ppm or less.

4. A lubricating oil for a refrigerator using a hydrofluorocarbon refrigerant, the oil comprising a sulfur type anti-wear agent and an ester of dipentaerythritol or tripentaerythritol with an aliphatic monobasic acid having 3 to 7 carbon atoms, or mixtures thereof, the oil having a viscosity at 100° C. in the range of 7 to 30 mm$^2$/s.

5. A lubricating oil for refrigerator according to claim 4, wherein the sulfur type anti-wear agent is expressed by the following general formula:

$$(RO)_3P=S$$

where R is an alkyl group, an allyl group or a phenyl group and may be the same or different.

6. A lubricating oil for a refrigerator using a hydrofluorocarbon refrigerant, the oil comprising an ester of an aliphatic monohydric alcohol with an aromatic dibasic acid, or mixtures thereof, the oil having a viscosity at 100° C. in the range of 2 to 30 mm$^2$/s.

7. A lubricating oil for a refrigerator using a hydrofluorocarbon refrigerant, the oil comprising an ester of an aliphatic monohydric alcohol with an aromatic dibasic acid, or mixtures thereof, and an organic carboxylic acid ester having viscosity different from that of said ester, or a polymer selected from polyalkyl-methacrylate, polyalkyleneglycol and a polyester of neopentylglycol with a fatty acid, the oil having a viscosity at 100° C. in the range of 2 to 30 mm$^2$/s.

8. A lubricating oil for refrigerator according to claim 6 or 7, wherein the oil has a total acid value of 0.05 mg KOH/g or less, a peroxide value of 1 meq./kg or less, an aldehyde value of 1 mg KOH/g or less, a bromine value index of 10 mg/100 or less, an ash content of 10 ppm or less, and a moisture content of 500 ppm or less.

9. A lubricating oil for a refrigerator using a hydrofluorocarbon refrigerant, the oil comprising of a sulfur type anti-wear agent and an ester of an aliphatic monohydric alcohol with an aromatic dibasic acid, or mixtures thereof, the oil having a viscosity at 100° C. in the range of 2 to 30 mm$^2$/s.

10. A lubricating oil for a refrigerator according to claim 9, where the sulfur type anti-wear agent is expressed by the following general formula:

$$(RO)_3P=S$$

where R is an alkyl group, an allyl group or a phenyl group and may be the same or different.

11. A lubricating oil for a refrigerator using a hydrofluorocarbon refrigerant, the oil comprising a complex ester of an aliphatic polyhydric alcohol with a polybasic acid selected from aliphatic dibasic acids, aromatic dibasic acids, aromatic tribasic acids, aromatic tetrabasic acids and aliphatic monobasic acids having 3 to 12 carbon atoms, or mixtures thereof, the oil having viscosity at 100° C. in the range of 2 to 30 mm$^2$/s.

12. A lubricating oil for a refrigerator using a hydrofluorocarbon refrigerant, the oil comprising a complex ester of an aliphatic polyhydric alcohol with a polybasic acid selected from aliphatic dibasic acids, aromatic dibasic acids, aromatic tribasic acids, aromatic tetrabasic acids and aliphatic monobasic acids having 3 to 12 carbon atoms, or mixtures thereof, and an organic carboxylic acid ester having viscosity different from that of the complex ester, or a polymer selected from polyalkylmethacrylate, polyalkyleneglycol and a polyester of neopentylglycol with a fatty acid, the oil having a viscosity at 100° C. in the range of 2 to 30 mm$^2$/s.

13. A lubricating oil for refrigerator according to claim 11 or 12, wherein the oil has a total acid value of 0.05 mg KOH/g or less, a peroxide value of 1 meq./kg or less, an aldehyde value of 1 mg KOH/g or less, a bromine value index of 10 mg/100 or less, an ash content of 10 ppm or less, and a moisture content of 500 ppm or less.

14. A lubricating oil for a refrigerator using a hydrofluorocarbon refrigerant, the oil comprising a complex ester of an aliphatic polyhydric alcohol with a polybasic acid selected from aliphatic dibasic acids, aromatic dibasic acids, aromatic tribasic acids, aromatic tetrabasic acids and aliphatic monobasic acids having 3 to 12 carbon atoms, or mixtures thereof, and a sulfur type anti-wear agent, the oil having viscosity at 100° C. in the range of 2 to 30 mm²/s.

15. A lubricating oil for a refrigerator according to claim 14, where the sulfur type anti-wear agent is expressed by the following general formula:

$$(RO)_3P=S$$

where R is an alkyl group, an allyl group or a phenyl group and may be the same or different.

16. A lubricating oil for a refrigerator using a hydrofluorocarbon refrigerant, the oil consisting of an ester of a polyoxyalkyleneglycol, the oil consisting of an ester of a polyoxyalkyleneglycol monoether with a dicarboxylic acid given by the following general formula (A), or mixtures thereof, or an ester of a polyoxyalkylene addition derivative of trimethylolalkane given by the following general formula (B), or mixtures thereof, the oil having a viscosity at 100° C. in the range of 2 to 30 mm²/s, wherein general formula (A) is:

$$R^1O-(R^2O)_{\overline{m}}\overset{O}{\overset{\|}{C}}-R^3-\overset{O}{\overset{\|}{C}}(-OR^4)_n-OR^5$$

where $R^1$ or $R^5$ each represents an alkyl group having 1 to 8 carbon atoms, and these may be identical to or different from each other, $R^2$ or $R^4$ each represents an alkylene group having 2 to 6 carbon atoms, $R^3$ represents an alkylene group or aromatic ring having 2 to 8 carbon atoms and m or n represents an integer of 2 or more, and general formula (B) is:

$$\begin{array}{l}\phantom{R^1-}CH_2-O-(R^2O)_{\overline{p}}R^5\\ R^1-CH-O-(R^3O)_{\overline{q}}R^6\\ \phantom{R^1-}CH_2-O-(R^4O)_{\overline{r}}R^7\end{array}$$

where $R^1$ represent an alkyl group having 1 to 8 carbon atoms, $R^2$, $R^3$ or $R^4$ each represents an alkylene group having 2 to 6 carbon atoms, $R^5$, $R^6$ or $R^7$ each is an acyl group having 3 to 10 carbon atoms, and these may be identical to or different from each other, and p, q or r is an integer of 1 or more.

17. A lubricating oil for a refrigerator using a hydrofluorocarbon refrigerant, the oil consisting of an ester of a polyoxyalkyleneglycol monoether with a dicarboxylic acid given by the following general formula (A), or mixtures thereof, or an ester of polyalkylene addition derivative of trimethylolalkane given by the following general formula (B), or mixtures thereof, and an organic carboxylic acid ester having a viscosity different from that of the above ester, or a polymer selected from polyalkylmethacrylate, polyalkyleneglycol, and a polyester of neopentylglycol with a fatty acid, the oil having a viscosity of 100° C. in the range of 2 to 30 mm²/s, wherein general formula (A) is:

$$R^1O-(R^2O)_{\overline{m}}\overset{O}{\overset{\|}{C}}-R^3-\overset{O}{\overset{\|}{C}}(-OR^4)_n-OR^5$$

where $R^1$ or $R^5$ each represents an alkyl group having 1 to 8 carbon atoms, and these may be identical to or different from each other, $R^2$ or $R^4$ each represents an alkylene 2 group having 2 to 6 carbon atoms, $R^3$ represents an alkylene group or aromatic ring having 2 to 8 carbon atoms, and m or n represents an integer of 2 or more, and general formula (B) is:

$$\begin{array}{l}\phantom{R^1-}CH_2-O-(R^2O)_{\overline{p}}R^5\\ R^1-CH-O-(R^3O)_{\overline{q}}R^6\\ \phantom{R^1-}CH_2-O-(R^4O)_{\overline{r}}R^7\end{array}$$

where $R^1$ represent an alkyl group having 1 to 8 carbon atoms, $R^2$, $R^3$ or $R^4$ each represents an alkylene group having 2 to 6 carbon atoms, $R^5$, $R^6$ or $R^7$ each is an acyl group having 3 to 10 carbon atoms, and these may be identical to or different from each other, and p, q or r is an integer of 1 or more.

18. A lubricating oil for refrigerator according to claim 16 or 17, wherein the oil has a total acid value of 0.05 mg KOH/g or less, a peroxide value of 1 meq./kg or less, an aldehyde value of 1 mg KOH/g or less, a bromine value index of 10 mg/100 or less, an ash content of 10 ppm or less, and a moisture content of 500 ppm or less.

19. A lubricating oil for a refrigerator using a hydrofluorocarbon refrigerant, the oil consisting of an ester of polyoxy alkyleneglycol monoether with a carboxylic acid given by the following general formula (A), or mixtures thereof, or an ester of polyoxyalkylene addition derivative of trimethylolalkane given by the following general formula (B), or mixtures thereof, and a sulfur type anti-wear agent, the oil having viscosity at 100° C. in the range of 2 to 30 mm²/s, wherein general formula (A) is:

$$R^1O-(R^2O)_{\overline{m}}\overset{O}{\overset{\|}{C}}-R^3-\overset{O}{\overset{\|}{C}}(-OR^4)_n-OR^5$$

where $R^1$ or $R^5$ each represents an alkyl group having 1 to 8 carbon atoms, and these may be identical to or different from each other, $R^2$ or $R^4$ each represents an alkylene 2 group having 2 to 6 carbon atoms, $R^3$ represents an alkylene group or aromatic ring having 2 to 8 carbon atoms, and m or n represents an integer of 2 or more, and general formula (B) is:

$$\begin{array}{l}\phantom{R^1-}CH_2-O-(R^2O)_{\overline{p}}R^5\\ R^1-CH-O-(R^3O)_{\overline{q}}R^6\\ \phantom{R^1-}CH_2-O-(R^4O)_{\overline{r}}R^7\end{array}$$

where $R^1$ represent an alkyl group having 1 to 8 carbon atoms, $R^2$, $R^3$ or $R^4$ each represents an alkylene group having 2 to 6 carbon atoms, $R^5$, $R^6$ or $R^7$ each is an acyl group having 3 to 10 carbon atoms, and these may be identical to or different from each other, and p, q or r is an integer of 1 or more.

20. A lubricating oil for a refrigerator according to claim 19, where the sulfur type anti-wear agent is expressed by the following general formula:

$$(RO)_3P=S$$

where R is an alkyl group, an allyl group or a phenyl group and may be the same or different.

* * * * *

Adverse Decision In Interference

Patent No. 5,185,092, Masaaki Fukuda, Hirotaka Tomizawa, Mitsuo Ohta, Hideki Osaka, Satoshi Ogano, Takehisa Satoh, Kenji Ashibe, Takeshi Nomura, LUBRICATING OIL FOR REFRIGERATOR, Interference No. 103,526, final judgment adverse to the patentees rendered June 14, 2001, as to claims 1-20.

*(Official Gazette April 1, 2003)*